(12) United States Patent
McArdle et al.

(10) Patent No.: US 8,907,983 B2
(45) Date of Patent: Dec. 9, 2014

(54) SYSTEM AND METHOD FOR TRANSITIONING BETWEEN INTERFACE MODES IN VIRTUAL AND AUGMENTED REALITY APPLICATIONS

(75) Inventors: Terrence Edward McArdle, San Francisco, CA (US); Benjamin Zeis Newhouse, San Francisco, CA (US)

(73) Assignee: Aria Glassworks, Inc., San Francisco, CA (US)

( * ) Notice: Subject to any disclaimer, the term of this patent is extended or adjusted under 35 U.S.C. 154(b) by 220 days.

(21) Appl. No.: 13/269,231

(22) Filed: Oct. 7, 2011

(65) Prior Publication Data

US 2012/0086728 A1  Apr. 12, 2012

Related U.S. Application Data

(60) Provisional application No. 61/390,975, filed on Oct. 7, 2010, provisional application No. 61/448,128, filed on Mar. 1, 2011.

(51) Int. Cl.
*G09G 5/00* (2006.01)
*G06F 3/0481* (2013.01)

(52) U.S. Cl.
CPC .................................. *G06F 3/0481* (2013.01)
USPC ............................ 345/633; 345/635; 345/649

(58) Field of Classification Search
CPC ................................................... G06F 3/0481
See application file for complete search history.

(56) References Cited

U.S. PATENT DOCUMENTS

| | | |
|---|---|---|
| 5,287,437 A | 2/1994 | Deering |
| 5,841,439 A | 11/1998 | Pose et al. |
| 5,990,941 A | 11/1999 | Jackson et al. |
| 6,226,669 B1 | 5/2001 | Huang et al. |
| 6,389,179 B1 | 5/2002 | Katayama et al. |
| 6,760,026 B2 * | 7/2004 | Li et al. .......................... 345/427 |
| 7,133,068 B2 | 11/2006 | Fisher et al. |
| 7,224,326 B2 | 5/2007 | Sefton |

(Continued)

FOREIGN PATENT DOCUMENTS

WO    2008107553 A    9/2008

OTHER PUBLICATIONS

"Rotations and Euler angles" http://www.easyspin.org/documentation/eulerangles.html. Archived on Apr. 6, 2008. Retrieved on Nov. 5, 2013 from <https://web.archive.org/web/20080406234538/http://www.easyspin.org/documentation/eulerangles.html>.*

(Continued)

*Primary Examiner* — Kee M Tung
*Assistant Examiner* — Zhengxi Liu
(74) *Attorney, Agent, or Firm* — Kilpatrick Townsend & Stockton LLP

(57) ABSTRACT

One preferred embodiment of the present invention includes a method for transitioning a user interface between viewing modes. The method of the preferred embodiment can include detecting an orientation of a mobile terminal including a user interface disposed on a first side of the mobile terminal, wherein the orientation of the mobile terminal includes an imaginary vector originating at a second side of the mobile terminal and projecting in a direction substantially opposite the first side of the mobile terminal. The method of the preferred embodiment can also include transitioning between at least two viewing modes in response to the imaginary vector intersecting an imaginary sphere disposed about the mobile terminal at a first latitudinal point having a predetermined relationship to a critical latitude of the sphere.

30 Claims, 5 Drawing Sheets

(56) References Cited

U.S. PATENT DOCUMENTS

| | | | |
|---|---|---|---|
| 7,389,591 | B2 | 6/2008 | Jaiswal et al. |
| 7,424,218 | B2 | 9/2008 | Baudisch et al. |
| 7,499,586 | B2 | 3/2009 | Agarwala et al. |
| 7,564,469 | B2 | 7/2009 | Cohen |
| 8,041,574 | B2 | 10/2011 | Yano |
| 8,144,232 | B2 | 3/2012 | Larson et al. |
| 8,301,159 | B2 | 10/2012 | Hamynen et al. |
| 8,373,573 | B2 | 2/2013 | Chou et al. |
| 8,384,718 | B2 | 2/2013 | Dahlke |
| 8,730,156 | B2 | 5/2014 | Weising et al. |
| 2001/0030693 | A1 | 10/2001 | Fisher et al. |
| 2002/0158873 | A1 | 10/2002 | Williamson |
| 2004/0027330 | A1 | 2/2004 | Bradski |
| 2005/0219239 | A1 | 10/2005 | Mashitani et al. |
| 2005/0286125 | A1 | 12/2005 | Sundstrom et al. |
| 2006/0050140 | A1 | 3/2006 | Shin et al. |
| 2006/0082692 | A1 | 4/2006 | Kamijima et al. |
| 2007/0025723 | A1 | 2/2007 | Baudisch et al. |
| 2007/0035562 | A1 | 2/2007 | Azuma et al. |
| 2007/0076016 | A1 | 4/2007 | Agarwala et al. |
| 2007/0103543 | A1 | 5/2007 | Anderson et al. |
| 2007/0168418 | A1 | 7/2007 | Ratnakar |
| 2007/0236493 | A1 | 10/2007 | Horiuchi et al. |
| 2008/0042973 | A1 | 2/2008 | Zhao et al. |
| 2008/0071559 | A1 | 3/2008 | Arrasvuori |
| 2008/0082692 | A1 | 4/2008 | Yano |
| 2008/0094417 | A1 | 4/2008 | Cohen |
| 2008/0194323 | A1 | 8/2008 | Merkli et al. |
| 2008/0266326 | A1 | 10/2008 | Porwal |
| 2008/0280676 | A1 | 11/2008 | Distanik et al. |
| 2008/0292131 | A1 | 11/2008 | Takemoto et al. |
| 2008/0309508 | A1 | 12/2008 | Harmon |
| 2009/0140887 | A1 | 6/2009 | Breed et al. |
| 2009/0237564 | A1 | 9/2009 | Kikinis et al. |
| 2009/0240431 | A1 | 9/2009 | Chau et al. |
| 2009/0244097 | A1 | 10/2009 | Estevez |
| 2009/0292774 | A1 | 11/2009 | Box et al. |
| 2010/0002122 | A1 | 1/2010 | Larson et al. |
| 2010/0007657 | A1 | 1/2010 | Rurin |
| 2010/0066763 | A1 | 3/2010 | Macdougall et al. |
| 2010/0092079 | A1 | 4/2010 | Aller |
| 2010/0125816 | A1 | 5/2010 | Bezos |
| 2010/0161658 | A1 | 6/2010 | Hamynen et al. |
| 2010/0169837 | A1* | 7/2010 | Hyndman ............... 715/848 |
| 2010/0171758 | A1 | 7/2010 | Maassel et al. |
| 2010/0188397 | A1* | 7/2010 | Tsai et al. ............... 345/419 |
| 2010/0214111 | A1 | 8/2010 | Schuler et al. |
| 2010/0228633 | A1 | 9/2010 | Guimaraes et al. |
| 2010/0287485 | A1 | 11/2010 | Bertolami et al. |
| 2011/0041060 | A1 | 2/2011 | Chien et al. |
| 2011/0090252 | A1 | 4/2011 | Yoon et al. |
| 2011/0164116 | A1 | 7/2011 | Gay et al. |
| 2011/0201362 | A1 | 8/2011 | Bregman-Amitai et al. |
| 2011/0213861 | A1 | 9/2011 | Fanelli et al. |
| 2011/0242134 | A1 | 10/2011 | Miller et al. |
| 2011/0248987 | A1 | 10/2011 | Mitchell |
| 2011/0273451 | A1 | 11/2011 | Salemann |
| 2012/0086728 | A1 | 4/2012 | Mcardle et al. |
| 2012/0105440 | A1 | 5/2012 | Lieberman et al. |
| 2012/0113264 | A1 | 5/2012 | Moshrefi et al. |
| 2012/0212405 | A1 | 8/2012 | Newhouse et al. |
| 2012/0214590 | A1 | 8/2012 | Newhouse et al. |
| 2012/0218306 | A1 | 8/2012 | McArdle et al. |
| 2012/0236029 | A1 | 9/2012 | Newhouse et al. |
| 2012/0242656 | A1 | 9/2012 | McArdle et al. |
| 2012/0242798 | A1 | 9/2012 | McArdle et al. |
| 2012/0246223 | A1 | 9/2012 | Newhouse et al. |
| 2014/0092135 | A1 | 4/2014 | McArdle et al. |

OTHER PUBLICATIONS

"Motion Control Simulation Applet" http://ir.exp.sis.pitt.edu/res2/data/is/group5/. Archived on Sep. 1, 2006. Retrieved on Nov. 5, 2013 from <https://web.archive.org/web/20060901110520/http://ir.exp.sis.pitt.edu/res2/data/is/group5/>.*

Hwang, Jane, Jaehoon Jung, and Gerard Jounghyun Kim. "Handheld virtual reality: a feasibility study." Proceedings of the ACM symposium on Virtual reality software and technology. ACM, 2006.*

Ducket, Jon, "Beginning HTML, XHTML, CSS, and JavaScript (R)," Dec. 30, 2009, Wrox, p. 234.

Easypano Holdings Inc, "Panoweaver 6.00 User Manual", Copyright Easypano Holdings Inc., date unknown, downloaded from http://web.archive.org/web/20090711113513/http://www.easypano.com/download/doc/pw600_manual.pdf with an archive.orgverified date of Jul. 11, 2009, pp. 24-74.

Hewlett Packard, "HP Photosmart R717 Digital Camera with HP Instant Share User's Manual", Copyright 2005 Hewlett-Packard Development Company, L.P., downloaded from http://h1 0032.www1.hp.com/ctg/Manual/c00298985.pdf on May 3, 2013, pp. 50-54.

Fauster, Loris, and T. U. Wien. "Stereoscopic techniques in computer graphics." Tu Wien (2007), 10 pages.

Kanbara, Masayuki, et al. "A stereoscopic video see-through augmented reality system based on real-time vision-based registration." Virtual Reality, 2000. Proceedings. IEEE. IEEE, 2000, 8 pages.

Parr62, Ben; "Easter Egg: Yelp Is the iPhone's First Augmented Reality App,"; located at https://web.archive.org/web/20090829094113/http://mashable.com/2009/08/2007/yelp-aug...; Aug. 27, 2009; 10 pages.

Hildenbrand, Jerry; "Yelp 2.0 brings monocle and checkins to its Android Client,"; located at http://www.androidcentral.com/yelp-20-brings-monocle-andcheckins-its-android-client; Jul. 5, 2010; 10 pages.

* cited by examiner

US 8,907,983 B2

SYSTEM AND METHOD FOR TRANSITIONING BETWEEN INTERFACE MODES IN VIRTUAL AND AUGMENTED REALITY APPLICATIONS

CLAIM OF PRIORITY

The present application claims priority to U.S. Provisional Patent Application Ser. No. 61/390,975 filed on Oct. 7, 2010 entitled "Method for Transitioning Between Interface Modes in Virtual and Augmented Reality Applications," and U.S. Provisional Patent Application Ser. No. 61/448,128 filed on Mar. 1, 2011 entitled "Method for Transitioning Between Interface Modes in Virtual and Augmented Reality Applications," both of which are incorporated herein in their entirety by this reference.

TECHNICAL FIELD

This invention relates generally to the virtual and augmented reality field, and more specifically to a new and useful system and method for transitioning between interface modes in the virtual and augmented reality field.

BACKGROUND AND SUMMARY

With the gaining popularity of mobile phones and mobile/tablet computers, augmented reality applications are becoming more approachable by the general public. Augmented reality promises to provide new ways for people to interact with both the real world and virtual world. However, as the augmented reality and virtual realities becomes more widely accepted, there are numerous challenges to create an interface understandable by a wide variety of users. One aspect of augmented reality is that the interface elements are typically tied to real world objects and thus the interface may seem inconsistent based on the environment being augmented. Thus, there is a need in the virtual and augmented reality field to create a new and useful method for transitioning between interface modes.

Accordingly, one preferred embodiment of the present invention includes a method for transitioning a user interface between operational modes. The method of the preferred embodiment can include detecting an orientation of a user interface, wherein the orientation of the user interface includes an imaginary vector originating at the user interface and intersecting a surface of an imaginary sphere disposed about the user interface. The method of the preferred embodiment can further include rendering a first view in the user interface in response to the imaginary vector intersecting the surface at a first latitudinal position; and rendering a second view in the user interface in response to the imaginary vector intersecting the surface at a second latitudinal position.

A second preferred embodiment of the present invention includes a method for transitioning a user interface between viewing modes. The method of the preferred embodiment can include detecting an orientation of a mobile terminal including a user interface disposed on a first side of the mobile terminal, wherein the orientation of the mobile terminal includes an imaginary vector originating at a second side of the mobile terminal and projecting in a direction substantially opposite the first side of the mobile terminal. The method of the preferred embodiment can also include transitioning between at least two viewing modes in response to the imaginary vector intersecting an imaginary sphere disposed about the mobile terminal at a first latitudinal point having a predetermined relationship to a critical latitude of the sphere.

A third preferred embodiment of the present invention can include an apparatus including a user interface including a display on which at least two viewing modes are visible to a user. The apparatus of the preferred embodiment can also include an orientation module configured to determine a three-dimensional orientation of the user interface, wherein the three dimensional orientation can include an imaginary vector originating at the apparatus and intersecting a surface of an imaginary sphere disposed about the apparatus. The apparatus of the preferred embodiment can also include a processor connected to the user interface and the orientation module and adapted to manage a transition between the at least two viewing modes in response to the imaginary vector intersecting the imaginary sphere at a first latitudinal point having a predetermined relationship to a critical latitude of the sphere.

Other features and advantages of the present invention will become apparent to those of skill in the art in the following detailed description of the preferred embodiments made with reference to the appended figures.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Apparatus Having at Least Two Viewing and/or Operational Modes

Figure 3:
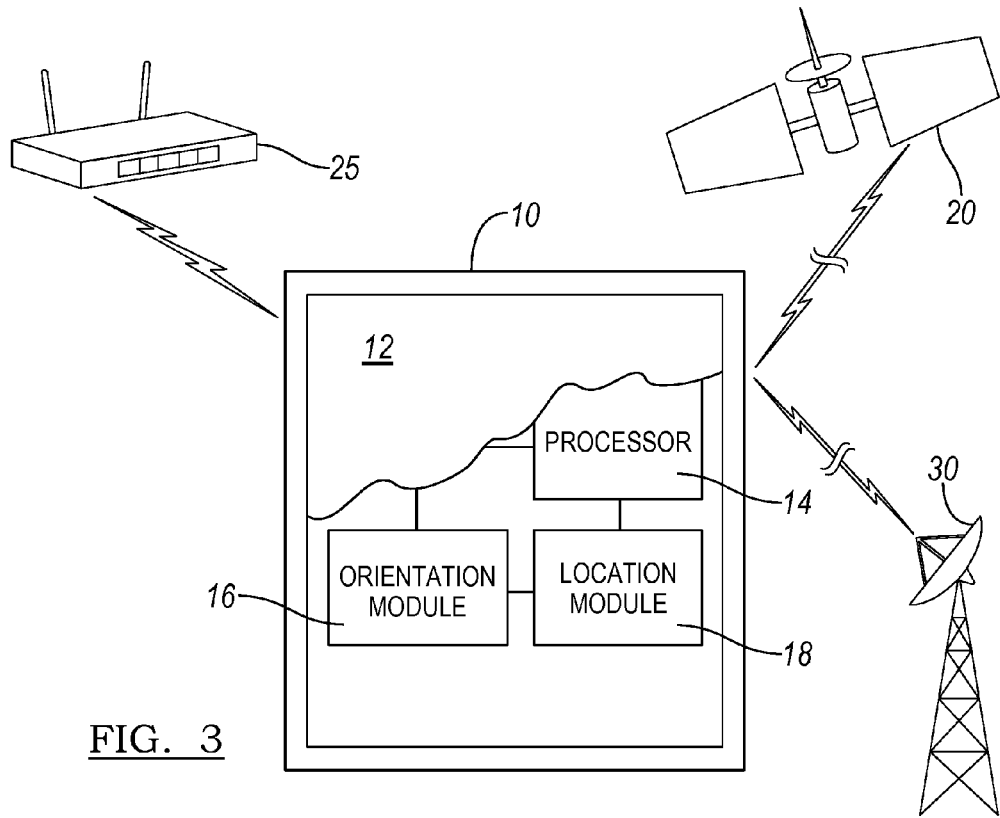

As shown in FIG. 3, an apparatus 10 of the preferred embodiment can include a user interface 12 including a display on which at least two viewing modes are visible to a user; an orientation module 16 configured to determine a three-dimensional orientation of the user interface; and a processor 14 connected to the user interface 12 and the orientation module 16 and adapted to manage a transition between the at least two viewing modes. The apparatus 10 of the preferred embodiment functions to create a seamless interface for providing a virtual-reality and/or augmented-reality viewing mode coupled to a traditional control viewing mode. Preferably, the apparatus 10 can include a device configured for processing both location-based and orientation-based data such as a smart phone or a tablet computer. The apparatus 10 also preferably includes one or more controls that are displayable and/or engagable through the user interface 12, which can be used in part to display and/or project the control/s. As described in detail below, apparatus 10 of the preferred embodiment can function as window into an augmented or mediated reality that superimposes virtual elements with reality-based elements.

Additionally, the apparatus 10 of the preferred embodiment can include an imaging system (not shown) having one or more cameras configured for performing image processing on the surrounding environment, including the user. In one variation of the apparatus 10 of the preferred embodiment, the imaging system can include a front facing camera that can be used to determine the position of the user relative to the apparatus 10. Alternatively, the apparatus 10 of the preferred embodiment can be configured to only permit a change in viewing modes in response to the user being present or within a viewing field of the imaging device. Additional sensors can include an altimeter, a distance sensor, an infrared tracking system, or any other suitable sensor configured for determining a the relative position of the apparatus 10, its environment, and its user.

Figure 1:
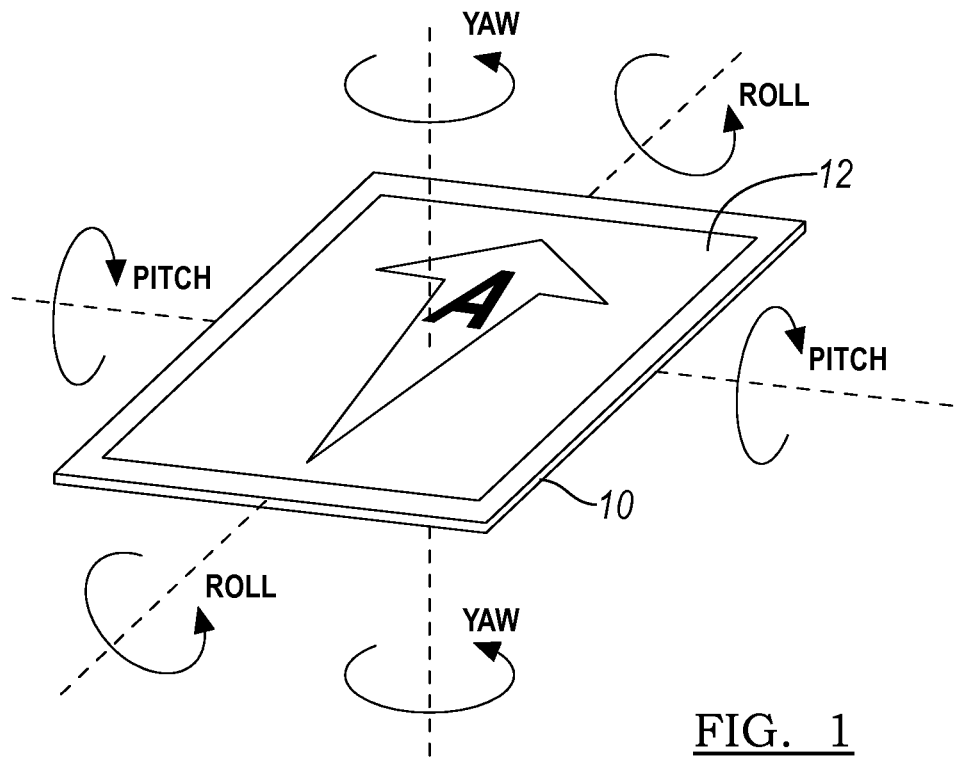
FIG. 1 is a schematic representation of an apparatus according to a preferred embodiment of the present invention.

As shown in FIG. 1, the apparatus 10 of the preferred embodiment can be generally handled and/or oriented in three-dimensions. Preferably, the apparatus 10 can have a directionality conveyed by arrow A such that the apparatus 10 defines a "top" and "bottom" relative to a user holding the apparatus 10. As shown, the apparatus 10 of the preferred embodiment can operate in a three-dimensional environment within which the apparatus can be rotated through three-degrees of freedom. Preferably, the apparatus 10 can be rotated about the direction of arrow A wherein the first degree of rotation is a roll value. Similarly, the apparatus 10 of the preferred embodiment can be rotated in a first direction substantially perpendicular to the arrow A wherein the second degree of rotation is a pitch value. Finally, the apparatus 10 of the preferred embodiment can be rotated in a second direction substantially mutually orthogonal to the roll and pitch plane, wherein the third degree of rotation is a yaw value. The orientation of the apparatus 10 of the preferred embodiment can be at least partially determined by a combination of its roll, pitch, and yaw values.

Figure 2:
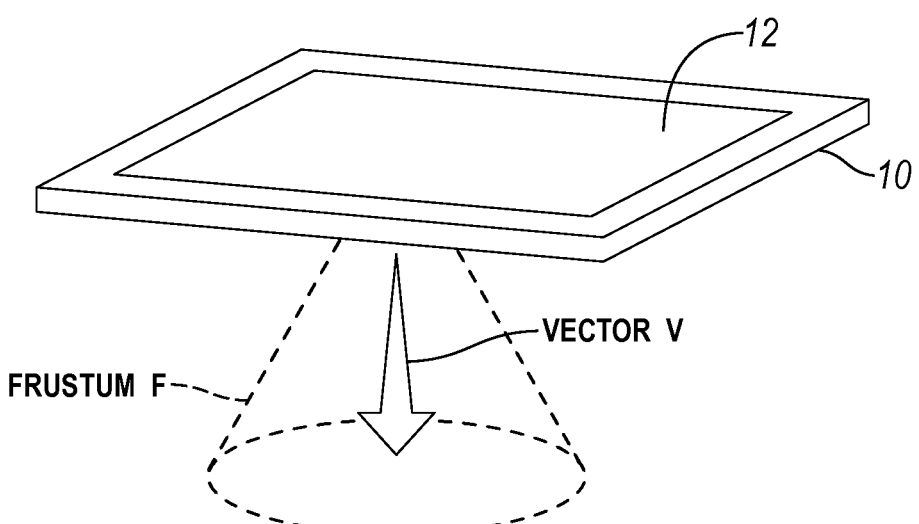
FIGS. 2 and 3 are schematic representations of additional aspects of the apparatus according to the preferred embodiment of the present invention.

As shown in FIG. 2, the apparatus 10 of the preferred embodiment can define an imaginary vector V that projects in a predetermined direction from the apparatus 10. Preferably, the vector V originates on a side of the apparatus 10 substantially opposite the user interface 12 such that the imaginary vector V is substantially collinear with and/or parallel to a line-of-sight of the user. As an example, the imaginary vector V will effectively be "pointed" in the direction in which the user is looking, such that if the apparatus 10 includes a camera (not shown) opposite the display, then the imaginary vector V can function as a pointer on an object of interest within the view frame of the camera. In one variation of the apparatus 10 of the preferred embodiment, the imaginary vector V can be arranged along a center axis of a view frustum F (shown in phantom), the latter of which can be substantially conical in nature and include a virtual viewing field for the camera.

Preferably, the orientation of the apparatus 10 corresponds with a directionality of the imaginary vector V. Furthermore, the directionality of the imaginary vector V preferably determines which of two or more operational modes the display 12 of the apparatus 10 of the preferred embodiment presents the user. Accordingly, the apparatus 10 of the preferred embodiment preferably presents a first viewing mode, a second viewing mode, and an optional transitional or hybrid viewing mode between the first and second viewing modes in response to a directionality of the imaginary vector V. Preferably, the first viewing mode can include a virtual and/or augmented reality display superimposed on reality-based information, and the second viewing mode can include a control interface through which the user can cause the apparatus 10 to perform one or more desired functions.

Figure 4:
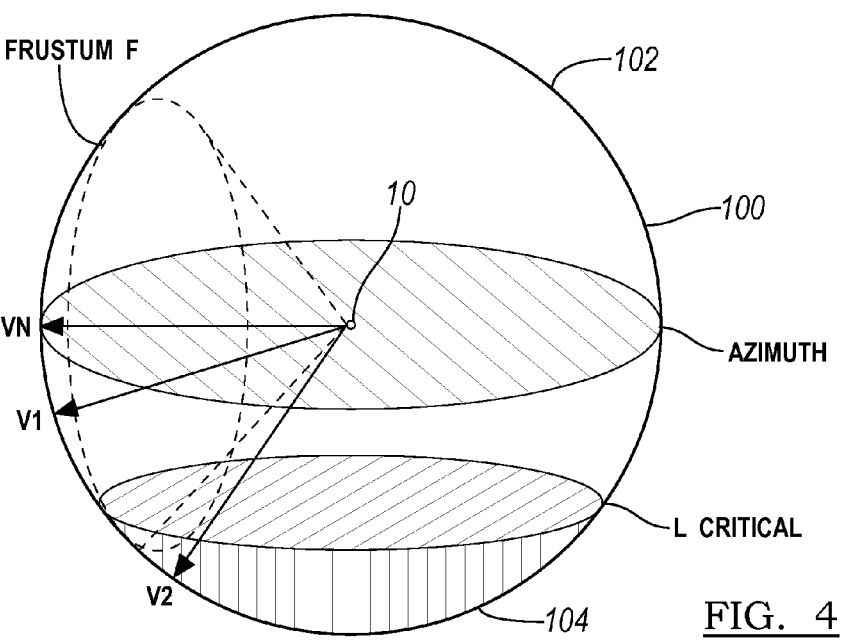
FIG. 4 is a schematic representation of an operational environment of the apparatus according to the preferred embodiment of the present invention.

As shown in FIG. 3, the orientation module 16 of the apparatus 10 of the preferred embodiment functions to determine a three-dimensional orientation of the user interface 12. As noted above, the three-dimensional orientation can include a roll value, a pitch value, and a yaw value of the apparatus 10. Alternatively, the three dimensional orientation can include an imaginary vector V originating at the apparatus and intersecting a surface of an imaginary sphere disposed about the apparatus, as shown in FIG. 4. In another alternative, the three-dimensional orientation can include some combination of two or more of the roll value, pitch value, yaw value, and/or the imaginary vector V, depending upon the physical layout and configuration of the apparatus 10.

The processor 14 of the apparatus 10 of the preferred embodiment functions to manage a transition between the viewing modes in response to a change in the orientation of the apparatus 10. In particular, the processor 14 preferably functions to adjust, change, and/or transition displayable material to a user in response to a change in the orientation of the apparatus 10. Preferably, the processor 14 can manage the transition between the viewing modes in response to the imaginary vector/s V1, V2, VN (and accompanying frustum F) intersecting the imaginary sphere at a first latitudinal point having a predetermined relationship to a critical latitude ($L_{CRITICAL}$) of the sphere. As shown in FIG. 4, the critical latitude can be below an equatorial latitude, also referred to as the azimuth or a reference plane. The critical latitude can be any other suitable location along the infinite latitudes of the sphere, but in general the position of critical latitude will be determined at least in part by the relative positioning of the imaginary vector V and the user interface 12. In the exemplary configuration shown in FIGS. 1, 2, 3 and 4, the imaginary vector V emanates opposite the user interface 12 such that a transition between the two or more viewing modes will occur when the apparatus is moved between a substantially flat position and a substantially vertical position.

As shown in FIG. 3, one variation of the apparatus 10 of the preferred embodiment includes a location module 18 connected to the processor 14 and the orientation module 16. The location module 18 of the preferred embodiment functions to determine a location of the apparatus 10. As used herein, location can refer to a geographic location, which can be indoors, outdoors, above ground, below ground, in the air or on board an aircraft or other vehicle. Preferably, as shown in FIG. 4, the apparatus 10 of the preferred embodiment can be connectable, either through wired or wireless means, to one or more of a satellite positioning system 20, a local area network or wide area network such as a WiFi network 25, and/or a cellular communication network 30. A suitable satellite position system 20 can include for example the Global Positioning System (GPS) constellation of satellites, Galileo, GLONASS, or any other suitable territorial or national satellite positioning system. In one alternative embodiment, the location module 18 of the preferred embodiment can include a GPS transceiver, although any other type of transceiver for satellite-based location services can be employed in lieu of or in addition to a GPS transceiver.

In another variation of the apparatus 10 of the preferred embodiment, the orientation module 16 can include an inertial measurement unit (IMU). The IMU of the preferred orientation module 16 can include one or more of a MEMS gyroscope, a three-axis magnetometer, a three-axis accelerometer, or a three-axis gyroscope in any suitable configuration or combination. Alternatively, the IMU can include one or more of one or more single-axis and/or double-axis sensors of the type noted above in a suitable combination for rendering three-dimensional positional information. Preferably, the IMU includes a suitable combination of sensors to determine a roll value, a pitch value, and a yaw value as shown in FIG. 1. As previously noted, any possible combination of a roll value, a pitch value, and a yaw value in combination with a directionality of the apparatus 10 corresponds to a unique imaginary vector V, from which the processor 14 can determine an appropriate viewing mode to present to the user. Alternatively, the IMU can preferably include a suitable combination of sensors to generate a non-transitory signal indicative of a rotation matrix descriptive of the three-dimensional orientation of the apparatus 10.

In another variation of the apparatus 10 of the preferred embodiment, the viewing modes can include a control mode and a reality mode. The control mode of the apparatus 10 of the preferred embodiment functions to permit a user to control one or more functions of the apparatus 10 through or with the assistance of the user interface. As an example, if the apparatus 10 is a tablet computer or other mobile handheld device, the control module can include one or more switches, controls, keyboards and the like for controlling one or more aspects or functions of the apparatus 10. Alternatively, the control mode of the apparatus 10 of the preferred embodiment can include a standard interface, such as a browser, for presenting information to a user. In one example embodiment, a user can "select" a real object in a reality mode (for example a hotel) and then transition to the control mode in which the user might be directed to the hotel's webpage or other webpages relating to the hotel.

The reality mode of the apparatus 10 of the preferred embodiment functions to present to the user one or more renditions of a real space, which can include for example: a photographic image of real space corresponding to an imaginary vector and/or frustum as shown in FIG. 4; modeled images of real space corresponding to the imaginary vector and/or frustum shown in FIG. 4; simulated images of real space corresponding to the imaginary vector and/or frustum as shown in FIG. 4, or any suitable combination thereof. Preferably, real space images can be received and/or processed by a camera connected to or integral with the apparatus 10 and oriented in the direction of the imaginary vector and/or frustum shown in FIG. 2.

The reality mode of the apparatus 10 of the preferred embodiment can include one or both of a virtual reality mode or an augmented reality mode. A virtual reality mode of the apparatus 10 of the preferred embodiment can include one or more models or simulations of real space that are based on—but not photographic replicas of—the real space at which the apparatus 10 is directed. The augmented reality mode of the apparatus 10 of the preferred embodiment can include either a virtual image or a real image of the real space augmented by additional superimposed and computer-generated interactive media, such as additional images of a particular aspect of the image, hyperlinks, coupons, narratives, reviews, additional images and/or views of an aspect of the image, or any suitable combination thereof. Preferably, the virtual and augmented reality view can be rendered through any suitable platform such as OpenGL, WebGL, or Direct3D. In one variation, HTML5 and CSS3 transforms are used to render the virtual and augmented reality view where the device orientation is fetched (e.g., through HTML5 or a device API) and used to periodically update (e.g., 60 frames per second) the CSS transform properties of media of the virtual and augmented reality view.

In another variation of the apparatus 10 of the preferred embodiment, the critical latitude corresponds to a predetermined pitch range, a predetermined yaw range, and a predetermined roll range. As noted above, the pitch value, yaw value, and roll value are all preferably measurable by the orientation module 16 of the apparatus 10 of the preferred embodiment. Accordingly, upon a determination that a predetermined pitch range, predetermined yaw range, and/or a predetermined roll range is satisfied, the processor 14 preferably causes the transition between the at least two viewing modes. As shown in FIG. 4, the critical latitude is substantially planar in form and is oriented substantially parallel to the azimuth. In other alternative embodiments, the critical latitude can be non-planar in shape (i.e., convex or concave) and oriented at acute or obtuse angle relative to the azimuth.

In another variation of the apparatus 10 of the preferred embodiment, the predetermined pitch range is more than approximately forty-five degrees below the azimuth. As shown in FIG. 4, imaginary vector V1 has a pitch angle of less than forty-five degrees below the azimuth, while imaginary vector V2 has a pitch angle of more than forty-five degrees below the azimuth. As shown, imaginary vector V1 intersects the surface of the sphere 100 in a first portion 102, which is above the critical latitude, and imaginary vector V2 intersects the sphere 100 in a second portion 104 below the critical latitude. Preferably, the different portions 102, 104 of the sphere 100 correspond to the one or more viewing modes of the apparatus 10. Preferably, the predetermined pitch range is such that the orientation of the apparatus 10 will be more horizontally disposed than vertically disposed (relative to the azimuth), such that an example pitch angle of ninety degrees corresponds to a user laying the apparatus 10 flat on a table and a pitch angle of zero degrees corresponds to the user holding the apparatus 10 flat against a vertical wall.

In another variation of the apparatus 10 of the preferred embodiment, the predetermined yaw range is between zero and one hundred eighty degrees about an imaginary line substantially perpendicular to the imaginary vector V. As shown in FIG. 1, the apparatus 10 of the preferred embodiment can have a desirable orientation along arrow A, which comports with the apparatus 10 having a "top" and "bottom" a user just as a photograph or document would have a "top" and "bottom." The direction of the arrow A shown in FIG. 1 can be measured as a yaw angle as shown in FIG. 1. Accordingly, in this variation of the apparatus 10 of the preferred embodiment, the "top" and "bottom" of the apparatus 10 can be rotatable and/or interchangeable such that in response to a rotation of approximately one hundred eighty degrees of yaw, the "top" and "bottom" can rotate to maintain an appropriate viewing angle for the user. In another alternative, the predetermined yaw value range can be between zero and approximately M degrees, wherein M degrees is approximately equal to three hundred sixty degrees divided by the number of sides S of the user interface. Thus, when S equals four sides, the predetermined yaw value range can be between zero and ninety degrees. Similarly, when S equals six sides, the predetermined yaw value range can be between zero and sixty degrees. Finally, for a substantially circular user interface, the view of the user interface can rotate with the increase/decrease in yaw value in real time or near real time to maintain the desired viewing orientation for the user.

In another variation of the apparatus 10 of the preferred embodiment, the predetermined roll range is more than approximately forty-five degrees below the azimuth. As shown in FIG. 4, imaginary vector V1 has a roll angle of less than forty-five degrees below the azimuth, while imaginary vector V2 has a roll angle of more than forty-five degrees below the azimuth. As previously noted, imaginary vector V1 intersects the surface of the sphere 100 in the first portion 102 and imaginary vector V2 intersects the sphere 100 in a second portion 104. Preferably, the different portions 102, 104 of the sphere 100 correspond to the one or more viewing modes of the apparatus 10. Preferably, the predetermined roll range is such that the orientation of the apparatus 10 will be more horizontally disposed than vertically disposed (relative to the azimuth), such that an example roll angle of ninety degrees corresponds to a user laying the apparatus 10 flat on a table and a roll angle of zero degrees corresponds to the user holding the apparatus 10 flat against a vertical wall.

In another variation of the apparatus 10 of the preferred embodiment, substantially identical constraints apply to the pitch value and the roll value. In the example embodiment shown in the FIGURES, the apparatus 10 can be configured as a substantially rectangular device having a user interface 12 that also functions as a display. The apparatus 10 of the preferred embodiment can be configured such that it is substantially agnostic to the pitch and/or roll values providing that the yaw value described above permits rotation of the user interface 12 in a rectangular manner, i.e., every ninety degrees.

In additional variations of the apparatus 10 of the preferred embodiment, the apparatus can employ any suitable measuring system and coordinate system for determining a relative orientation of the apparatus 10 in three dimensions. As noted above, the IMU of the apparatus 10 of the preferred embodiment can include any suitable sensor configured to produce a rotation matrix descriptive of the orientation of the apparatus 10. Preferably, the orientation of the apparatus 10 can be calculated as a point on an imaginary unit sphere (co-spherical with the imaginary sphere shown in FIG. 4) in Cartesian or any other suitable coordinates. Alternatively, the orientation of the apparatus can be calculated as an angular rotation about the imaginary vector to the point on the imaginary unit sphere. As an example, a pitch angle of negative forty-five degrees corresponds to a declination along the z-axis in a Cartesian system. In particular, a negative forty-five degree pitch angle corresponds to a z value of approximately 0.707, which is approximately the sine of forty-five degrees or one half the square root of two. Accordingly, the orientation of the apparatus 10 of the preferred embodiment can also be calculated, computed, determined, and/or presented more than one type of coordinates and in more than one type of coordinate system. Those of skill in the art will readily appreciate that operation and function of the apparatus 10 of the preferred embodiment is not limited to either Euler coordinates or Cartesian coordinates, nor to any particular combination or sub-combination of orientation sensors. Those of skill in the art will additionally recognize that one or more frames of reference for each of the suitable coordinate systems are readily usable, including for example at least an apparatus frame of reference and an external (real world) frame of reference).

2A. Method for Transitioning a User Interface Between Two Operational Modes

Figure 6:
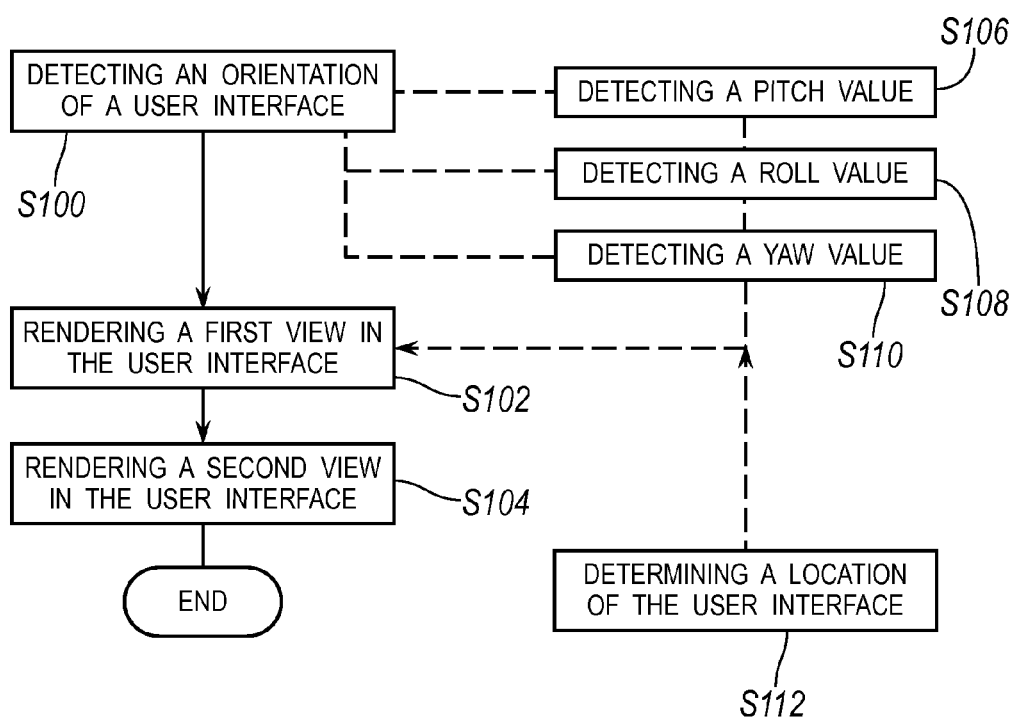
FIGS. 6 and 7 are flow charts depicting a method according to a preferred embodiment of the present invention and variations thereof.

As shown in FIG. 6, a method for transitioning a user interface between two viewing modes includes detecting an orientation of a user interface in block S100; rendering a first view in the user interface in block S102; and rendering a second view in the user interface in block S104. The method of the preferred embodiment functions to cause a user interface, preferably including a display, to transition between at least two viewing modes. Preferably, as described below, the at least two viewing modes can include a reality mode (including for example a virtual and/or augmented reality view) and a control mode.

Block S100 of the method of the preferred embodiment recites detecting an orientation of a user interface. Block S100 functions to detect, infer, determine, and or calculate a position of a user interface (which can be part of a larger apparatus) in three-dimensional space such that a substantially precise determination of the position of the user interface relative to objects in real space can be calculated and/or determined. Preferably, the orientation of the user interface can include an imaginary vector originating at the user interface and intersecting a surface of an imaginary sphere disposed about the user interface as shown in FIG. 4 and described above. The imaginary vector can preferably function as a proxy measurement or shorthand measurement of one or more other physical measurements of the user interface in three-dimensional space.

Block S102 of the method of the preferred embodiment recites rendering a first view in the user interface. Preferably, the first view is rendered in the user interface in response to the imaginary vector intersecting the surface at a first latitudinal position. Block S102 of the preferred embodiment functions to display one or more of a virtual/augmented-reality view and a control view on the user interface for viewing and/or use by the user. As shown in FIG. 4, the imaginary vector can be any number of an infinite number of imaginary vectors V1, V2, VN that can interest the surface of the sphere 100 in one of at least two different latitudinal regions 102, 104.

Block S104 of the method of the preferred embodiment recites rendering a second view in the user interface. Preferably, the second view is rendered in response to the imaginary vector intersecting the surface at a second latitudinal position. Block S104 of the method of the preferred embodiment functions to display one or more of a virtual/augmented-reality view and a control view on the user interface for viewing and/or use by the user. More preferably, the second view is preferably one of the virtual/augmented-reality view or the control view and the first view is preferably its opposite. Alternatively, either one of the first or second view can be a hybrid view including a blend or partial display of both of the virtual/augmented-reality view or the control view. As shown in FIG. 4, the imaginary vector of block S104 can be any number of an infinite number of imaginary vectors V1, V2, VN that can interest the surface of the sphere 100 in one of at least two different latitudinal regions 102, 104. Preferably, in blocks S102 and S104, the different latitudinal regions 102, 104 correspond to different views as between the virtual/augmented-reality view and the control view.

As shown in FIG. 6, one variation of the method of the preferred embodiment includes block S112, which recites detecting a location of the user interface. Block S112 functions to receive, calculate, determine, and/or detect a geographical location of the user interface in real space. Preferably, the geographical location can be indoors, outdoors, above ground, below ground, in the air or on board an aircraft or other vehicle. Preferably, block S112 can be performed through wired or wireless means via one or more of a satellite positioning system, a local area network or wide area network such as a WiFi network, and/or a cellular communication network. A suitable satellite position system can include for example the GPS constellation of satellites, Galileo, GLONASS, or any other suitable territorial or national satellite positioning system. In one alternative embodiment, block S112 can be performed at least in part by a GPS transceiver, although any other type of transceiver for satellite-based location services can be employed in lieu of or in addition to a GPS transceiver.

As shown in FIG. 6, another variation of the method of the preferred embodiment can include blocks S106, S108, and S110, which recite detecting a pitch value, detecting a roll value, and detecting a yaw value, respectively. Blocks 106, S108, and S110 can function, alone or in combination, in determining, measuring, calculating, and/or detecting the orientation of the user interface. The quantities pitch value, roll value, and yaw value preferably correspond to various angular degrees shown in FIG. 1, which illustrates an possible orientation for a substantially rectangular apparatus having a preferred directionality conveyed by arrow A. The user interface of the method of the preferred embodiment can operate in a three-dimensional environment within which the user interface can be rotated through three-degrees of freedom. Preferably, the pitch value, roll value, and yaw value are mutually orthogonal angular values, the combination or sub-combination of which at least partially determine the orientation of the user interface in three dimensions.

Preferably, one or more of blocks S106, S108, and S110 can be performed by an IMU, which can include one or more of a MEMS gyroscope, a three-axis magnetometer, a three-axis accelerometer, or a three-axis gyroscope in any suitable configuration or combination. Alternatively, the IMU can include one or more of one or more single-axis and/or double-axis sensors of the type noted above in a suitable combination for rendering three-dimensional positional information. Preferably, the IMU can include a suitable combination of sensors to determine a roll value, a pitch value, and a yaw value as shown in FIG. 1. Alternatively, the IMU can preferably include a suitable combination of sensors to generate a non-transitory signal indicative of a rotation matrix descriptive of the three-dimensional orientation of the apparatus.

In another variation of the method of the preferred embodiment, the first view includes one of a virtual reality view or an augmented reality view. A virtual reality view of the method of the preferred embodiment can include one or more models or simulations of real space that are based on—but not photographic replicas of—the real space that the user is wishing to view. The augmented reality view of the method of the preferred embodiment can include either a virtual image or a real image of the real space augmented by additional superimposed and computer-generated interactive media including, such as additional images of a particular aspect of the image, hyperlinks, coupons, narratives, reviews, additional images and/or views of an aspect of the image, or any suitable combination thereof.

The augmented and/or virtual reality views can include or incorporate one or more of: photographic images of real space corresponding to an imaginary vector and/or frustum as shown in FIG. 4; modeled images of real space corresponding to the imaginary vector and/or frustum shown in FIG. 4; simulated images of real space corresponding to the imaginary vector and/or frustum as shown in FIG. 4, or any suitable combination thereof. Real space images can be preferably be received and/or processed by a camera connected to or integral with the user interface and oriented in the direction of the imaginary vector and/or frustum shown in FIG. 2. Preferably, the virtual and augmented reality view can be rendered through any suitable platform such as OpenGL, WebGL, or Direct3D. In one variation, HTML5 and CSS3 transforms are used to render the virtual and augmented reality view where the device orientation is fetched (e.g., through HTML5 or a device API) and used to periodically update (e.g., 60 frames per second) the CSS transform properties of media of the virtual and augmented reality view.

In another variation of the method of the preferred embodiment, the second view can include a user control view. The user control view of the method of the preferred embodiment functions to permit a user to control one or more functions of an apparatus through or with the assistance of the user interface. As an example, if the apparatus is a tablet computer or other mobile handheld device of the type described above, the user control view can include one or more switches, controls, keyboards and the like for controlling one or more aspects or functions of the apparatus. Alternatively, the user control view of the method of the preferred embodiment can include a standard interface, such as a browser, for presenting information to a user. In one example embodiment, a user can "select" a real object in a augmented-reality or virtual-reality mode (for example a hotel) and then transition to the control mode in which the user might be directed to the hotel's webpage or other webpages relating to the hotel.

In another variation of the method of the preferred embodiment, the first latitudinal position can be relatively higher than the second latitudinal position. As shown in FIG. 4, a latitudinal position of an imaginary vector V1 is higher than that of an imaginary vector V2, and the latter is beneath a critical latitude indicating that the displayable view is distinct from that shown when the user interface is oriented to the first latitudinal position. In another variation of the method of the preferred embodiment, the critical latitude corresponds to a predetermined pitch range, a predetermined yaw range, and a predetermined roll range. As noted above, the pitch value, yaw value, and roll value are all preferably measurable according to the method of the preferred embodiment. As noted above, FIG. 4 illustrates the critical latitude as substantially planar in form and substantially parallel to the azimuth. In other alternative embodiments, the critical latitude can be non-planar in shape (i.e., convex or concave) and oriented at acute or obtuse angle relative to the azimuth.

Preferably, upon a determination that a predetermined pitch range, predetermined yaw range, and/or a predetermined roll range is satisfied, the method of the preferred embodiment causes the transition between the first view and the second view on the user interface. As an example, the method of the preferred embodiment can transition between the first and second views in response to a pitch value of less/greater than forty-five degrees below the azimuth. Alternatively, the method of the preferred embodiment can transition between the first and second views in response to a roll value of less/greater than forty-five degrees below the azimuth.

In another variation of the method of the preferred embodiment, the predetermined yaw range is between zero and one hundred eighty degrees about an imaginary line substantially perpendicular to the imaginary vector V. As shown described above with reference FIG. 1, an user interface of the preferred embodiment can have a desirable orientation along arrow A, which comports with the user interface having a "top" and "bottom" a user just as a photograph or document would have a "top" and "bottom." The direction of the arrow A shown in FIG. 1 can be measured as a yaw angle as shown in FIG. 1. Accordingly, in this variation of the method of the preferred embodiment, the "top" and "bottom" of the user interface can be rotatable and/or interchangeable such that in response to a rotation of approximately one hundred eighty degrees of yaw, the "top" and "bottom" can rotate to maintain an appropriate viewing angle for the user. In another alternative, the predetermined yaw value range can be between zero and approximately M degrees, wherein M degrees is approximately equal to three hundred sixty degrees divided by the number of sides S of the user interface. Thus, for S equals four sides, the predetermined yaw value range can be between zero and ninety degrees. Similarly, for S equals six sides, the predetermined yaw value range can be between zero and sixty degrees. Finally, for a substantially circular user interface, the view of the user interface can rotate with the increase/decrease in yaw value in real time or near real time to maintain the desired viewing orientation for the user.

In additional variations of the method of the preferred embodiment, the apparatus can employ any suitable measuring system and coordinate system for determining a relative orientation of the apparatus 10 in three dimensions. As noted above, the IMU of the method of the preferred embodiment can include any suitable sensor configured to produce a rotation matrix descriptive of the orientation of the apparatus. Preferably, the orientation of the apparatus can be calculated as a point on an imaginary unit sphere (co-spherical with the imaginary sphere shown in FIG. 4) in Cartesian or any other suitable coordinates. Alternatively, the orientation of the apparatus can be calculated as an angular rotation about the imaginary vector to the point on the imaginary unit sphere. As noted above, a pitch angle of negative forty-five degrees corresponds to a declination along the z-axis in a Cartesian system. In particular, a negative forty-five degree pitch angle corresponds to a z value of approximately 0.707, which is approximately the sine of forty-five degrees or one half the square root of two. Accordingly, calculation of the orientation in the method of the preferred embodiment can also be calculated, computed, determined, and/or presented more than one type of coordinates and in more than one type of coordinate system. Those of skill in the art will readily appreciate that performance of the method of the preferred embodiment is not limited to either Euler coordinates or Cartesian coordinates, nor to any particular combination or sub-combination of orientation sensors. Those of skill in the art will additionally recognize that one or more frames of reference for each of the suitable coordinate systems are readily usable, including for example at least an apparatus frame of reference and an external (real world) frame of reference).

2B. Method for Transitioning a User Interface Between Two Viewing Modes.

Figure 7:
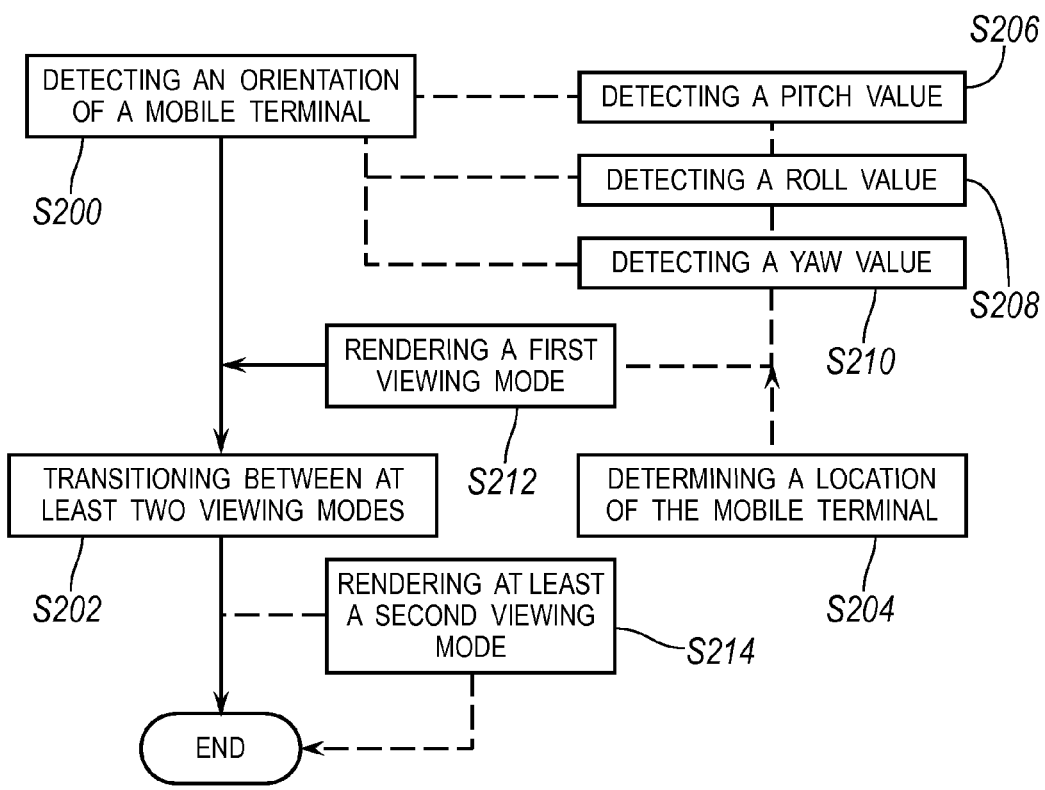

As shown in FIG. 7, a method of the preferred embodiment can include detecting an orientation of a mobile terminal in block S200 and transitioning between at least two viewing modes in block S202. The method of the preferred embodiment function to cause a mobile, preferably including a display and/or a user interface, to transition between at least two viewing modes. Preferably, as described below, the at least two viewing modes can include a reality mode (including for example a virtual and/or augmented reality view) and a control mode.

Block S200 of the method of the preferred embodiment recites detecting an orientation of a mobile terminal. A mobile terminal can include any type of apparatus described above, as well as a head-mounted display of the type described below. Preferably, the mobile terminal includes a user interface disposed on a first side of the mobile terminal, and the user interface preferably includes a display of the type described above. In one variation of the method of the preferred embodiment, the orientation of the mobile terminal can include an imaginary vector originating at a second side of the mobile terminal and projecting in a direction substantially opposite the first side of the mobile terminal. For example, the imaginary vector relating to the orientation can be substantially collinear and/or parallel with a line-of-sight of a user such that a display disposed on the first side of the mobile terminal functions substantially as a window through which the user views for example an augmented or virtual reality.

Block S202 recites transitioning between at least two viewing modes. Block S202 functions to change, alter, substitute, and/or edit viewable content, either continuously or discretely, such that the view of a user is in accordance with an augmented/virtual reality or a control interface for the mobile terminal. Preferably, the transition of block S202 occurs in response to the imaginary vector intersecting an imaginary sphere disposed about the mobile terminal first latitudinal point having a predetermined relationship to a critical latitude of the sphere, as shown in FIG. 4. As previously described, FIG. 4 illustrates imaginary vector V1 intersecting the sphere 100 at a point above the critical latitude and imaginary vector V2 intersecting the sphere 100 at a point below the critical latitude. In the preferred embodiments described above, the top portion of the sphere 100 corresponds with the augmented-reality or virtual-reality viewing mode and the bottom portion corresponds with the control-interface viewing mode.

As shown in FIG. 7, one variation of the method of the preferred embodiment includes block S204, which recites determining a location of the mobile terminal. Block S204 functions to receive, calculate, determine, and/or detect a geographical location of the user interface in real space. Preferably, the geographical location can be indoors, outdoors, above ground, below ground, in the air or on board an aircraft or other vehicle. Preferably, block S204 can be performed through wired or wireless means via one or more of a satellite positioning system, a local area network or wide area network such as a WiFi network, and/or a cellular communication network. A suitable satellite position system can include for example the GPS constellation of satellites, Galileo, GLONASS, or any other suitable territorial or national satellite positioning system. In one alternative embodiment, block S204 can be performed at least in part by a GPS transceiver, although any other type of transceiver for satellite-based location services can be employed in lieu of or in addition to a GPS transceiver.

As shown in FIG. 7, another variation of the method of the preferred embodiment can include blocks S206, S208, and S210, which recite detecting a pitch value, detecting a roll value, and detecting a yaw value, respectively. Blocks S206, S208, and S210 can function, alone or in combination, in determining, measuring, calculating, and/or detecting the orientation of the user interface. The quantities pitch value, roll value, and yaw value preferably correspond to various angular degrees shown in FIG. 1, which illustrates an possible orientation for a substantially rectangular apparatus having a preferred directionality conveyed by arrow A. The user interface of the method of the preferred embodiment can operate in a three-dimensional environment within which the user interface can be rotated through three-degrees of freedom. Preferably, the pitch value, roll value, and yaw value are mutually orthogonal angular values, the combination or sub-combination of which at least partially determine the orientation of the user interface in three dimensions.

Preferably, one or more of blocks S206, S208, and S210 can be performed by an IMU, which can include one or more of a MEMS gyroscope, a three-axis magnetometer, a three-axis accelerometer, or a three-axis gyroscope in any suitable configuration or combination. Alternatively, the IMU can include one or more of one or more single-axis and/or double-axis sensors of the type noted above in a suitable combination for rendering three-dimensional positional information. Preferably, the IMU can include a suitable combination of sensors to determine a roll value, a pitch value, and a yaw value as shown in FIG. 1. Alternatively, the IMU can preferably include a suitable combination of sensors to generate a non-transitory signal indicative of a rotation matrix descriptive of the three-dimensional orientation of the apparatus.

As shown in FIG. 7, another variation of the method of the preferred embodiment can include blocks S212 and S214, which recite rendering a first viewing mode and rendering a second viewing mode, respectively. The first and second viewing modes of the method of the preferred embodiment function to display one or more of a virtual/augmented-reality view and a control view on the user interface for viewing and/or use by the user. More preferably, the first viewing mode is preferably one of the virtual/augmented-reality view or the control view and the second viewing mode is preferably its opposite. Alternatively, either one of the first or second viewing modes can be a hybrid view including a blend or partial display of both of the virtual/augmented-reality view or the control view.

In another variation of the method of the preferred embodiment, the first viewing mode includes one of a virtual reality mode or an augmented reality mode. A virtual reality mode of the method of the preferred embodiment can include one or more models or simulations of real space that are based on—but not photographic replicas of—the real space that the user is wishing to view. The augmented reality mode of the method of the preferred embodiment can include either a virtual image or a real image of the real space augmented by additional superimposed and computer-generated interactive media including, such as additional images of a particular aspect of the image, hyperlinks, coupons, narratives, reviews, additional images and/or views of an aspect of the image, or any suitable combination thereof.

The augmented and/or virtual reality modes can include or incorporate one or more of: photographic images of real space corresponding to an imaginary vector and/or frustum as shown in FIG. 4; modeled images of real space corresponding to the imaginary vector and/or frustum shown in FIG. 4; simulated images of real space corresponding to the imaginary vector and/or frustum as shown in FIG. 4, or any suitable combination thereof. Real space images can be preferably be received and/or processed by a camera connected to or integral with the user interface and oriented in the direction of the imaginary vector and/or frustum shown in FIG. 2. Preferably, the virtual and augmented reality modes can be rendered through any suitable platform such as OpenGL, WebGL, or Direct3D. In one variation, HTML5 and CSS3 transforms are used to render the virtual and augmented reality view where the device orientation is fetched (e.g., through HTML5 or a device API) and used to periodically update (e.g., 60 frames per second) the CSS transform properties of media of the virtual and augmented reality view.

In another variation of the method of the preferred embodiment, the second viewing mode can include a control mode. The control mode of the method of the preferred embodiment functions to permit a user to control one or more functions of an apparatus through or with the assistance of the user interface. As an example, if the apparatus is a tablet computer or other mobile handheld device of the type described above, the user control view can include one or more switches, controls, keyboards and the like for controlling one or more aspects or functions of the apparatus. Alternatively, the control mode of the method of the preferred embodiment can include a standard user interface, such as a browser, for presenting information to a user. In one example embodiment, a user can "select" a real object in a augmented-reality or virtual-reality mode (for example a hotel) and then transition to the control mode in which the user might be directed to the hotel's webpage or other webpages relating to the hotel.

In another variation of the method of the preferred embodiment, the predetermined pitch range is more than approximately forty-five degrees below the azimuth. As shown in FIG. 4, imaginary vector V1 has a pitch angle of less than forty-five degrees below the azimuth, while imaginary vector V2 has a pitch angle of more than forty-five degrees below the azimuth. As shown, imaginary vector V1 intersects the surface of the sphere 100 in a first portion 102, which is above the critical latitude, and imaginary vector V2 intersects the sphere 100 in a second portion 104 below the critical latitude. Preferably, the different portions 102, 104 of the sphere 100 correspond to the one or more viewing modes of the apparatus 10. Preferably, the predetermined pitch range is such that the orientation of the user interface will be more horizontally disposed than vertically disposed (relative to the azimuth) as noted above.

In another variation of the method of the preferred embodiment, the predetermined yaw range is between zero and one hundred eighty degrees about an imaginary line substantially perpendicular to the imaginary vector V. As shown in FIG. 1, the apparatus 10 of the preferred embodiment can have a desirable orientation along arrow A, which comports with the apparatus 10 having a "top" and "bottom" a user just as a photograph or document would have a "top" and "bottom." The direction of the arrow A shown in FIG. 1 can be measured as a yaw angle as shown in FIG. 1. Accordingly, in this variation of the method of the preferred embodiment, the "top" and "bottom" of the apparatus 10 can be rotatable and/or interchangeable such that in response to a rotation of approximately one hundred eighty degrees of yaw, the "top" and "bottom" can rotate to maintain an appropriate viewing angle for the user. In another alternative, the predetermined yaw value range can be between zero and approximately M degrees, wherein M degrees is approximately equal to three hundred sixty degrees divided by the number of sides S of the user interface. Thus, for S equals four sides, the predetermined yaw value range can be between zero and ninety degrees. Similarly, for S equals six sides, the predetermined yaw value range can be between zero and sixty degrees. Finally, for a substantially circular user interface, the view of the user interface can rotate with the increase/decrease in yaw value in real time or near real time to maintain the desired viewing orientation for the user.

In another variation of the method of the preferred embodiment, the predetermined roll range is more than approximately forty-five degrees below the azimuth. As shown in FIG. 4, imaginary vector V1 has a roll angle of less than forty-five degrees below the azimuth, while imaginary vector V2 has a roll angle of more than forty-five degrees below the azimuth. As previously noted, imaginary vector V1 intersects the surface of the sphere 100 in the first portion 102 and imaginary vector V2 intersects the sphere 100 in a second portion 104. Preferably, the different portions 102, 104 of the sphere 100 correspond to the one or more viewing modes of the apparatus 10. Preferably, the predetermined roll range is such that the orientation of the user interface will be more horizontally disposed than vertically disposed (relative to the azimuth) as noted above.

In additional variations of the method of the preferred embodiment, the apparatus can employ any suitable measuring system and coordinate system for determining a relative orientation of the apparatus 10 in three dimensions. As noted above, the IMU of the method of the preferred embodiment can include any suitable sensor configured to produce a rotation matrix descriptive of the orientation of the apparatus. Preferably, the orientation of the apparatus can be calculated as a point on an imaginary unit sphere (co-spherical with the imaginary sphere shown in FIG. 4) in Cartesian or any other suitable coordinates. Alternatively, the orientation of the apparatus can be calculated as an angular rotation about the imaginary vector to the point on the imaginary unit sphere. As noted above, a pitch angle of negative forty-five degrees corresponds to a declination along the z-axis in a Cartesian system. In particular, a negative forty-five degree pitch angle corresponds to a z value of approximately 0.707, which is approximately the sine of forty-five degrees or one half the square root of two. Accordingly, calculation of the orientation in the method of the preferred embodiment can also be calculated, computed, determined, and/or presented more than one type of coordinates and in more than one type of coordinate system. Those of skill in the art will readily appreciate that performance of the method of the preferred embodiment is not limited to either Euler coordinates or Cartesian coordinates, nor to any particular combination or sub-combination of orientation sensors. Those of skill in the art will additionally recognize that one or more frames of reference for each of the suitable coordinate systems are readily usable, including for example at least an apparatus frame of reference and an external (real world) frame of reference).

3. Example Operation of the Preferred Apparatus and Methods

Figure 5A:
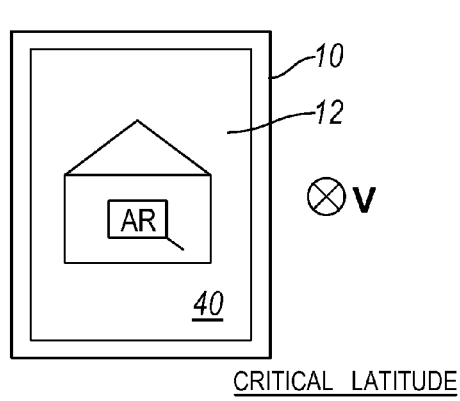
FIGS. 5A, 5B, 5C, 5D, and 5E are schematic representations of additional aspects of the apparatus according to the preferred embodiment of the present invention.

FIG. 5A schematically illustrates the apparatus 10 and methods of the preferred embodiment in an augmented-reality viewing mode 40 displayed on the user interface 12. As shown, the imaginary vector V is entering the page above the critical latitude, i.e., such that that pitch value is substantially less than the critical latitude. The augmented-reality viewing mode 40 of the preferred embodiment can include one or more tags (denoted AR) permitting a user to access additional features about the object displayed.

Figure 5B:
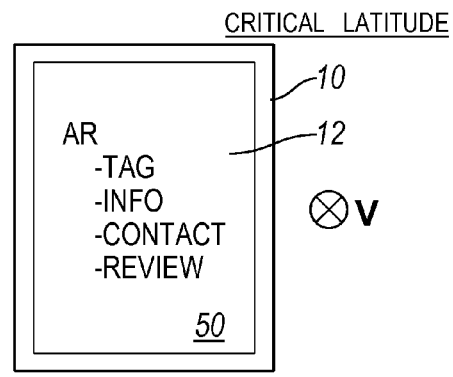

FIG. 5B schematically illustrates the apparatus 10 and methods of the preferred embodiment in a control-viewing mode 50 displayed on the user interface 12. As shown, the imaginary vector V is entering the page below the critical latitude, i.e., such that the pitch value is substantially greater than the critical latitude. The control-viewing mode 50 of the preferred embodiment can include one or more options, controls, interfaces, and/or interactions with the AR tag selectable in the augmented-reality viewing mode 40. Example control features shown in FIG. 5B include tagging an object or feature for later reference, retrieving information about the object or feature, contacting the object or feature, reviewing and/or accessing prior reviews about the object or feature and the like.

Figure 5C:
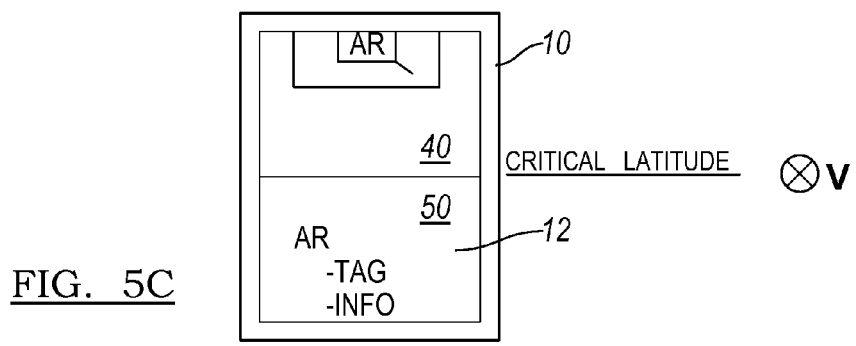

As shown in FIG. 5C, a third viewing mode according to the apparatus 10 and methods of the preferred embodiment can include a hybrid-viewing mode between the augmented/virtual-reality viewing mode 40 and the control-viewing mode 50. As shown, the imaginary vector V is entering the page at or near the transition line that divides the augmented/virtual-reality viewing mode 40 and the control-viewing mode 50, which in turn corresponds to the pitch value being approximately at or on the critical latitude. The hybrid-viewing mode preferably functions to transition between the augmented/virtual-reality viewing mode 40 and the control-viewing mode 50 in both directions. That is, the hybrid-viewing mode preferably functions to gradually transition the displayed information as the pitch value increases and decreases. In one variation of the apparatus 10 and methods of the preferred embodiment, the hybrid-viewing mode can transition in direct proportion to a pitch value of the apparatus 10. Alternatively, the hybrid-viewing mode can transition in direct proportion to a rate of change in the pitch value of the apparatus 10. In yet another alternative, the hybrid-viewing mode can transition in direct proportion to a weighted or unweighted blend of the pitch value, rate of change in the pitch value (angular velocity), and/or rate of change in the angular velocity (angular acceleration.) Alternatively, the hybrid-viewing mode can transition in a discrete or stepwise fashion in response to a predetermined pitch value, angular velocity value, and/or angular acceleration value. Alternatively, the apparatus 10 and methods of the preferred embodiment can utilize a hysteresis function to prevent unintended transitions between the at least two viewing modes.

Figure 5D:
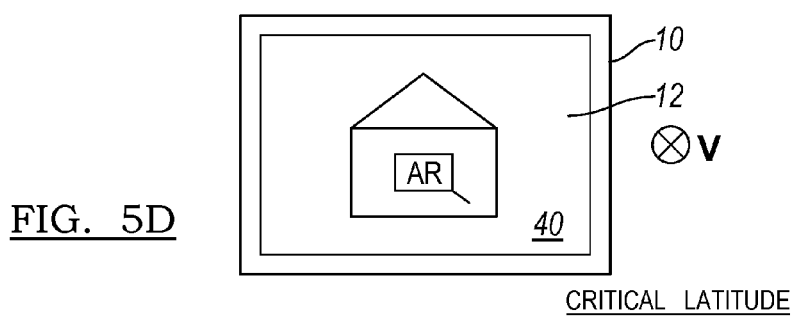

As shown in FIG. 5D, the apparatus 10 and methods of the preferred embodiment can function substantially identically independent of the particular orientation of its own sides. In the example rectangular configuration shown, FIG. 5D is substantially identical to FIG. 5A with the exception of the relative position of the longer and shorter sides of the apparatus 10 (also known as "portrait" and "landscape" views). As shown, the imaginary vector V is entering the page substantially above the critical latitude, such that the roll value is substantially less than the critical latitude. The augmented-reality viewing mode 40 of the preferred embodiment can include one or more tags (denoted AR) permitting a user to access additional features about the object displayed.

Figure 5E:
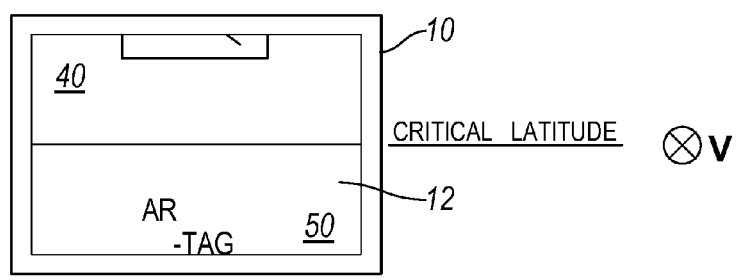

Similarly, as shown in FIG. 5E, the hybrid-viewing mode is operable in an askew orientation of the apparatus 10 of the preferred embodiment. As shown, the imaginary vector V is entering the page at or near the transition line that divides the augmented/virtual-reality viewing mode 40 and the control-viewing mode 50, which in turn corresponds to the roll value being approximately at or one the critical latitude. As noted above, the hybrid-viewing mode preferably functions to transition between the augmented/virtual-reality viewing mode 40 and the control-viewing mode 50 in both directions. In one variation of the apparatus 10 and methods of the preferred embodiment, the hybrid-viewing mode can transition in direct proportion to a roll value of the apparatus 10. Alternatively, the hybrid-viewing mode can transition in direct proportion to a rate of change in the roll value of the apparatus 10. In yet another alternative, the hybrid-viewing mode can transition in direct proportion to a weighted or unweighted blend of the roll value, rate of change in the roll value (angular velocity), and/or rate of change in the angular velocity (angular acceleration.) Alternatively, the hybrid-viewing mode can transition in a discrete or stepwise fashion in response to a predetermined roll value, angular velocity value, and/or angular acceleration value. Alternatively, the apparatus 10 and methods of the preferred embodiment can utilize a hysteresis function to prevent unintended transitions between the at least two viewing modes.

As an exemplary application of the preferred apparatus and methods, a program on an apparatus such as a smartphone or tablet computer can be used to navigate to different simulated real-world locations. The real-world locations are preferably spherical images from different geographical locations. When holding the apparatus predominately upward, the user can turn around, tilt and rotate the phone to explore the simulated real-world location as if he was looking through a small window into the world. By moving the phone flat, and looking down on it, the phone enters a navigation user interface that displays a graphic of a map with different interest points. Selecting one of the interest points preferably changes the simulated real-world location to that interest point. Returning to an upward position, the phone transitions out of the navigation user interface to reveal the virtual and augmented reality interface with the newly selected location. As an example, the user can perform large scale navigation in the control mode, i.e., moving a pin or avatar between streets in a city, then enter the augmented-reality or virtual-reality mode at a point in the city to experience an immersive view of the location in all directions through the display of the apparatus 10.

As another exemplary application of a preferred apparatus and methods, the apparatus can be used to annotate, alter, affect, and/or interact with elements of a virtual and augmented reality view. While in a virtual and augmented reality view, an object or point can be selected (e.g., either through taping a touch screen, using the transition selection step described above, or using any suitable technique). Then, when in the interactive control mode, an annotation tool can be used to add content or interact with that selected element of the virtual and augmented reality view. The annotation can be text, media, or any suitable parameter including for example photographs, hyperlinks, and the like. After adding an annotation, when in the virtual and augmented reality mode, the annotation is preferably visible at least to the user. As an example, a user can tap on a location in the augmented reality or virtual reality mode and annotate, alter, affect, and/or interact with it in the control interface mode as a location that he or she has recently visited, a restaurant at which he or she has dined, which annotation/s, alteration/s, affect/s, and/or interaction/s will be visible to the user when entering the augmented reality or virtual reality mode once again. Conversely, a user's actions (e.g., annotation, alteration, affectation, interaction) in the augmented reality or virtual reality mode can be made visible to the user when in the control interface mode. As an example, if a user tags a pins a location in the augmented reality mode, such a tag or pin can be visible to the user in the control interface mode, for example as a pin dropped on a two-dimensional map displayable to the user.

The apparatus 10 and methods of the preferred embodiment can be embodied and/or implemented at least in part as a machine configured to receive a computer-readable medium storing computer-readable instructions. The instructions are preferably executed by computer-executable components preferably integrated with the user interface 12 and one or more portions of the processor 14, orientation module 16 and/or location module 18. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
  detecting, by a processor, an orientation of a user interface, wherein the orientation of the user interface is determined based on a direction of a vector projected from the user interface;
  rendering a first view in the user interface in a first viewing mode in response to the direction of the vector being directed less than a predetermined critical angle rotated from a reference vector projected from the user interface, wherein the first view is a full-screen view of an augmented or virtual reality, and wherein the reference vector is substantially aligned with a center axis of a view frustum of the augmented or virtual reality; and
  switching to render a second view in the user interface in a second viewing mode in response to the direction of the vector being directed greater than the predetermined critical angle rotated from the reference vector, wherein the second view is a full-screen view of an interactive control interface, and there is no overlapping between the first and the second views.

2. The method of claim 1, further comprising detecting a location of the user interface.

3. The method of claim 1, wherein detecting an orientation comprises detecting a pitch value, detecting a roll value, and detecting a yaw value.

4. The method of claim 1, wherein the first viewing mode corresponds to an augmented reality view that comprises computer-generated interactive media superimposed on the first view.

5. The method of claim 4, wherein the computer-generated interactive media is superimposed on an image of real space in the first view.

6. The method of claim 5, wherein the image of real space comprises an image rendered by a camera connected to the user interface.

7. The method of claim 1, wherein the second viewing mode corresponds to a control mode, and the interactive control interface includes a function to add annotations that are rendered in the first view.

8. The method of claim 1 wherein the first viewing mode corresponds to a virtual reality view mode and the first view comprises one or more computer-generated.

9. The method of claim 1, further comprising:
  receiving a selection of an object in the first view;
  transitioning from the first viewing mode to the second viewing mode; and
  rendering, in the second view, data related to the object selected in the first view.

10. The method of claim 1, wherein the critical angle represents an angular difference between the reference vector and a second vector projected from the user interface to a coplanar point on a critical latitude about the user interface.

11. A method comprising:
  detecting, by a processor, an orientation of a mobile terminal having a user interface disposed on a first side of the mobile terminal, wherein the orientation of the mobile terminal is determined based on a direction of a vector projected from a second side of the mobile terminal substantially opposite the first side of the mobile terminal;
  detecting a change in the direction of the vector corresponding to a change in the orientation of the mobile terminal, wherein the change is an angular change from a reference vector projected from the second side of the mobile terminal, and wherein the reference vector is substantially aligned with a center axis of a view frustum of an augmented or virtual reality; and
  transitioning between two viewing modes rendered on the user interface based on the change in the direction of the vector corresponding to the change in the orientation of the mobile terminal from being directed less than a predetermined critical angle to greater than the predetermined critical angle, wherein the two viewing modes are a first viewing mode and a second viewing mode, and wherein the first viewing mode includes a full-screen view of the augmented or virtual reality, the second viewing mode includes a full-screen view of an interactive control interface, and there is no overlapping content between the first and the second viewing modes.

12. The method of claim 11, further comprising the step of determining a location of the mobile terminal.

13. The method of claim 11, wherein detecting an orientation comprises detecting a pitch value, detecting a roll value, and detecting a yaw value.

14. The method of claim 11, wherein the predetermined critical angle corresponds to a predetermined pitch range, a predetermined yaw range, and a predetermined roll range.

15. The method of claim 14, wherein the predetermined pitch range is more than approximately forty-five degrees below an azimuth.

16. The method of claim 14, wherein the predetermined yaw range is between zero and one hundred eighty degrees about a line substantially perpendicular to the vector.

17. The method of claim 14, wherein the predetermined roll range is more than approximately forty-five degrees below an azimuth.

18. The method of claim 11, wherein the transitioning between two viewing modes further comprises rendering a hybrid viewing mode that includes a partial display of a first viewing mode and a second viewing mode.

19. The method of claim 11, wherein the critical angle represents an angular difference between the reference vector and a second vector projected from the user interface to a coplanar point on a critical latitude about the user interface.

20. An apparatus comprising:
a user interface having a display configured to render on at least two viewing modes;
an orientation sensor configured to determine a three-dimensional orientation of the user interface, wherein the three-dimensional orientation is determined based on a direction of a vector projected within a three-dimensional space from the apparatus; and
a processor connected to the user interface and the orientation sensor and adapted to detect a change in the direction of the vector from a reference vector projected from the apparatus, wherein the change corresponds to a change in the orientation of the user interface, and wherein the reference vector is substantially aligned with a center axis of a view frustum of an augmented or virtual reality, and manage a transition between two viewing modes of the at least two viewing modes rendered on the user interface based on whether the change in the direction of the vector from the reference vector crosses above a predetermined critical angle, wherein the two viewing modes are a first viewing mode and a second viewing mode, and wherein the first viewing mode includes a full-screen view of the augmented or virtual reality, the second viewing mode includes a full-screen view of an interactive control interface, and there is no overlapping content between the first and the second viewing modes.

21. The apparatus of claim 20, further comprising a location sensor configured to determine a location of the apparatus.

22. The apparatus of claim 21, wherein the location sensor comprises a GPS transceiver.

23. The apparatus of claim 20, wherein the orientation sensor comprises an inertial measurement unit.

24. The apparatus of claim 23, wherein the inertial measurement unit comprises one of a three-axis magnetometer, a three-axis accelerometer, or a three-axis gyroscope.

25. The apparatus of claim 20, wherein the predetermined critical angle corresponds to a predetermined pitch range, a predetermined yaw range, and a predetermined roll range.

26. The apparatus of claim 25, wherein the predetermined pitch range is more than approximately forty-five degrees below an azimuth.

27. The apparatus of claim 25, wherein the predetermined yaw range is between zero and one hundred eighty degrees about a line substantially perpendicular to the vector.

28. The method of claim 25, wherein the predetermined roll range is more than approximately forty-five degrees below an azimuth.

29. The apparatus of claim 20, wherein the processor is adapted to render a hybrid viewing mode that includes a partial display of a first viewing mode and a second viewing mode during the transition between two viewing modes.

30. The apparatus of claim 20, wherein the critical angle represents an angular difference between the reference vector and a second vector projected from the user interface to a coplanar point on a critical latitude about the user interface.

* * * * *